United States Patent
Shirk et al.

[19]

[11] Patent Number: 6,099,027
[45] Date of Patent: Aug. 8, 2000

[54] DECORATIVE EMBLEM FOR AIR BAG MODULE COVER

[75] Inventors: Bryan W. Shirk; Timothy A. Swann, both of Mesa; Jess A. Cuevas, Scottsdale; Ahmad K. Al-Amin, Higley; Roy D. Van Wynsberghe, Mesa, all of Ariz.

[73] Assignee: TRW Inc., Lyndhurst, Ohio

[21] Appl. No.: 09/106,431

[22] Filed: Jun. 29, 1998

[51] Int. Cl.[7] .................................................. B60R 21/16
[52] U.S. Cl. ........................... 280/728.3; 280/731; 40/593
[58] Field of Search .............................. 280/743.2, 728.3, 280/731, 727; 40/593

[56] References Cited

U.S. PATENT DOCUMENTS

| | | | |
|---|---|---|---|
| 4,514,920 | 5/1985 | Shafrir et al. | 40/448 |
| 4,995,638 | 2/1991 | Shinto et al. . | |
| 5,294,147 | 3/1994 | Edge | 280/728.3 |
| 5,306,042 | 4/1994 | Frank | 280/728.3 |
| 5,335,935 | 8/1994 | Proos et al. | 280/728.3 |
| 5,338,059 | 8/1994 | Inoue et al. | 280/728.3 |
| 5,465,998 | 11/1995 | Davis . | |
| 5,519,516 | 5/1996 | Wreede | 359/3 |
| 5,542,694 | 8/1996 | Davis . | |
| 5,678,851 | 10/1997 | Saito et al. | 280/728.3 |
| 5,685,056 | 11/1997 | Fischer . | |
| 5,775,721 | 7/1998 | Grout | 280/727 |
| 5,780,797 | 7/1998 | Budnik | 200/61.55 |
| 5,851,022 | 12/1998 | Yamamoto et al. | 280/728.3 |
| 5,853,190 | 12/1998 | Rion et al. | 280/728.2 |
| 5,887,892 | 3/1999 | Burdack et al. | 280/731 |
| 5,913,534 | 6/1999 | Klinghauf | 280/728.3 |
| 5,947,512 | 9/1999 | Magoteaux et al. . | |
| 5,979,933 | 11/1999 | Murar et al. | 280/731 |

FOREIGN PATENT DOCUMENTS 1-81351  5/1989  Japan ................................. 280/728.3

*Primary Examiner*—Paul N. Dickson
*Attorney, Agent, or Firm*—Tarolli, Sundheim, Covell, Tummino & Szabo L.L.P.

[57] ABSTRACT

A vehicle safety apparatus (10) includes a protection device (12) inflatable from a deflated condition to an inflated condition to help protect a vehicle occupant. Support structure (22) mounts the protection device (12) on a portion of a vehicle. A cover (30) includes a portion (42) movable from a closed condition to an open condition upon inflation of the protection device (12). The apparatus (10) further comprises an emblem (60). The movable cover portion (42) has an opening (50) through which the emblem (60) is visible to the vehicle occupant. The emblem (60) is retained in a position aligned with the opening (50) in the cover portion (42) when the protection device (12) is in the deflated condition. The emblem (60) is movable relative to the cover portion (42) upon inflation of the protection device (12). Means (70) connected to the emblem (60) and to the support structure (22) resists movement of the emblem away from the support structure beyond a predetermined amount upon inflation of the protection device (12).

10 Claims, 3 Drawing Sheets

DECORATIVE EMBLEM FOR AIR BAG MODULE COVER

BACKGROUND OF THE INVENTION

1. Technical Field

The present invention relates to a cover for an air bag module. In particular, the present invention relates to an air bag module cover having a decorative emblem.

2. Description of the Prior Art

A typical air bag module includes an air bag and an inflator. In the event of sudden vehicle deceleration of a magnitude which requires protection of a vehicle occupant, the inflator is actuated to inflate the air bag into a position to help protect the occupant.

The air bag module commonly includes a cover with one or more movable parts to enable the cover to open and allow the air bag to inflate into a position to help protect the occupant. A decorative emblem, such as one having the name of the vehicle manufacturer, may be mounted on the cover. If the emblem is mounted on a movable part of the cover, the emblem moves when the movable cover part opens upon inflation of the air bag. Because the movable cover part opens forcefully and rapidly upon inflation of the air bag, the emblem must be securely fastened to the cover.

SUMMARY OF THE INVENTION

The present invention is a vehicle safety apparatus comprising a vehicle occupant protection device inflatable from a deflated condition to an inflated condition to help protect a vehicle occupant. Support structure mounts the protection device on a portion of a vehicle. The apparatus also comprises a cover including a portion movable from a closed condition to an open condition upon inflation of said protection device. The apparatus further comprises an emblem. The movable cover portion has an opening through which the emblem is visible to the vehicle occupant. The emblem is retained in a position aligned with the opening in the cover portion when the protection device is in the deflated condition. The emblem is movable relative to the cover portion upon inflation of the protection device. The apparatus further comprises means connected to the emblem and to the support structure for resisting movement of the emblem away from the support structure beyond a predetermined amount upon inflation of the protection device.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
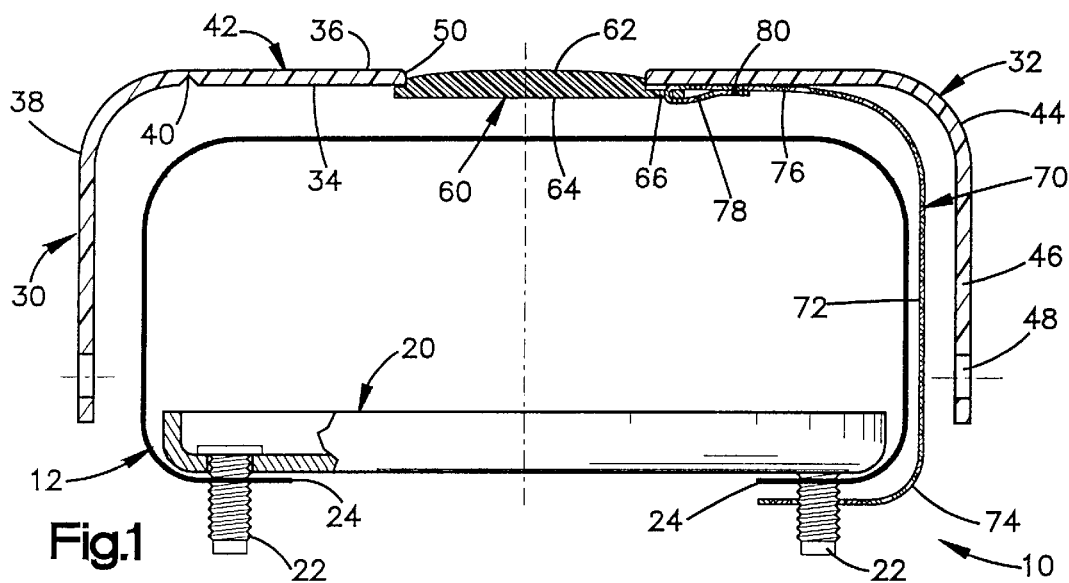
FIG. 1 is a schematic view, partially in section, of an air bag module including an emblem mounted on the cover of the module.

The present invention relates to a vehicle safety apparatus which includes a decorative emblem on a cover of an air bag module. As representative of the present invention, FIG. 1 illustrates an air bag module 10. The air bag module 10 is mounted on a vehicle steering wheel (not shown). Other inflatable vehicle occupant protection devices that can be used in accordance with the invention include, for example, inflatable seat belts, inflatable knee bolsters, inflatable head liners or side curtains, and knee bolsters operated by inflatable air bags.

The module 10 includes an air bag 12 illustrated schematically in a deflated, packed condition in FIG. 1. The air bag 12 is preferably made from a fabric material such as woven nylon. The air bag 12 can alternatively be made from non-woven material, such as plastic film. The use of plastic film, in particular, would require inflation fluid vents to be formed in the air bag 12, as is known in the art.

The air bag module 10 includes an inflator 14 which has one or more fluid outlets 16 for directing inflation fluid into the air bag 12 upon actuation of the inflator. The inflator 14 may be a pyrotechnic inflator which uses the combustion of gas-generating material to generate inflation fluid in the form of gas to inflate the air bag 12. The module 10 alternatively could include an inflator which contains a stored quantity of pressurized inflation fluid, or a combination of pressurized inflation fluid and ignitable material for heating the inflation fluid.

The module 10 includes a retaining ring 20 from which extend a plurality of fasteners 22, such as weld studs. The inflator 14 is connected in a manner not shown with the retaining ring 20. The fasteners 22 on the retaining ring 20 extend through openings in an end portion 24 of the air bag 12. The retaining ring 20 is secured to a portion of the vehicle, such as the vehicle steering wheel or steering column, by the fasteners 22.

The air bag module 10 includes a cover 30 for enclosing the air bag 12 and the inflator 14. The cover 30 is made from a material which is strong enough to protect the parts of the air bag module 10 which are enclosed within the cover. The material of the cover 30 is sufficiently flexible or deformable so that it can be resiliently deformed inwardly (that is, in a downward direction as viewed in FIG. 1) by pressure from an occupant of the vehicle The cover 30 has a main body portion 32 which has inner and outer side surfaces 34 and 36. The main body portion 32 of the cover 30 includes a fixed part 38 of the cover.

A tear seam 40 is formed in the cover 30 to enable inflation of the air bag 12 out of the cover. The tear seam 40 defines a movable part 42 of the cover 30. The movable part 42 of the cover 30 is pivotable relative to the fixed part 38, about a hinge portion 44 of the cover, in a clockwise direction as viewed in FIG. 1, upon inflation of the air bag 12 and rupturing of the tear seam 40.

A mounting flange or mounting portion 46 of the cover 30 extends from the main body portion 32 in a direction toward the retaining ring 20. A plurality of fastener openings 48 are formed in the mounting portion 46 of the cover 30. The fastener openings 48 receive rivets or other fasteners (not shown) for securing the cover 30 to the steering wheel or other portion of the vehicle structure.

An opening 50 is formed in the movable portion 42 of the cover 30. An emblem 60 is visible through the opening 50 in the cover 30. The emblem 60 may be a decorative emblem which includes indicia such as the name or logo of the vehicle manufacturer. The emblem 60 has an outer side surface 62 and an inner side surface 64. The emblem 60 as illustrated projects at least partially into the opening 50. The emblem 60 preferably snaps into the opening 50 in the cover 30 to help connect the emblem with the movable cover portion 42. The emblem 60 has a fastening slot 66 at one end of the emblem.

The air bag module 10 includes a flexible tether 70 for helping to resist movement of the emblem 60 away from the retaining ring 20. In the illustrated embodiment, the tether 70 is made from an elongate strap of fabric material, such as woven nylon of the type from which the air bag 12 is constructed.

The tether 70 has a central portion 72 and first and second opposite end portions 74 and 76. The first end portion 74 of the tether 70 is connected to the vehicle structure by two of the fasteners 22 on the retaining ring 20. The second end portion 76 of the tether 70 is formed into a loop 78 and extends through the fastening slot 66 in the emblem 60. The loop 78 is sewn to itself at 80 to connect the second end portion 76 of the tether 70 with the emblem 60.

The vehicle includes known means (not shown) for sensing a collision involving the vehicle and for actuating the inflator 14 in response to the sensing of a collision. The means may include a deceleration sensor and vehicle electric circuitry for actuating the inflator 14 in response to sensing a vehicle deceleration indicative of a vehicle collision having a severity greater than a predetermined threshold value.

In the event of an impact to the vehicle of a magnitude greater than the predetermined threshold value, the sensing means provides an electrical signal over lead wires to the inflator 14. The inflator 14 is actuated in a known manner. Inflation fluid flows out of the inflator 14 through the fluid outlets 16 and into the air bag 12. The rapidly flowing inflation fluid causes the air bag 12 to inflate in an upward direction as viewed in FIG. 1.

The force of the inflating air bag 12 is applied toward the inside of the emblem 60 and the cover 30. Specifically, the inflating air bag 12 pushes outward against the inner side surface 64 of the emblem 60 and against the inner side surface 34 of the cover 30. The cover 30 opens along the tear seam 40, which is the predetermined weakened portion of the cover. The movable part 42 of the cover 30 opens sufficiently that the air bag 12 inflates into a position to help protect the vehicle occupant.

When the cover 30 moves to the open condition, the emblem 60 moves with the movable cover part 42. It is desirable that the emblem 60 be retained on the movable cover part 42 when the cover 30 opens. The primary mechanism for retention of the emblem 60 on the cover 30 is the engagement of the emblem in the opening 50 in the cover. The tether 70 acts as a secondary retention mechanism. Specifically, if the force of the inflating air bag 12 should cause the emblem 60 to disengage from the cover 30, the tether 70 straightens and extends and blocks movement of the emblem away from the retaining ring 20 beyond a predetermined amount. The predetermined amount is the length of the tether 70 when extended. Because the tether 70 is flexible, the emblem 60 can be positioned as desired on the cover 30, relative to the retaining ring 22. At the same time, a secure connection can be provided across the distance between the emblem 60 and the retaining ring 22.

Figure 2:
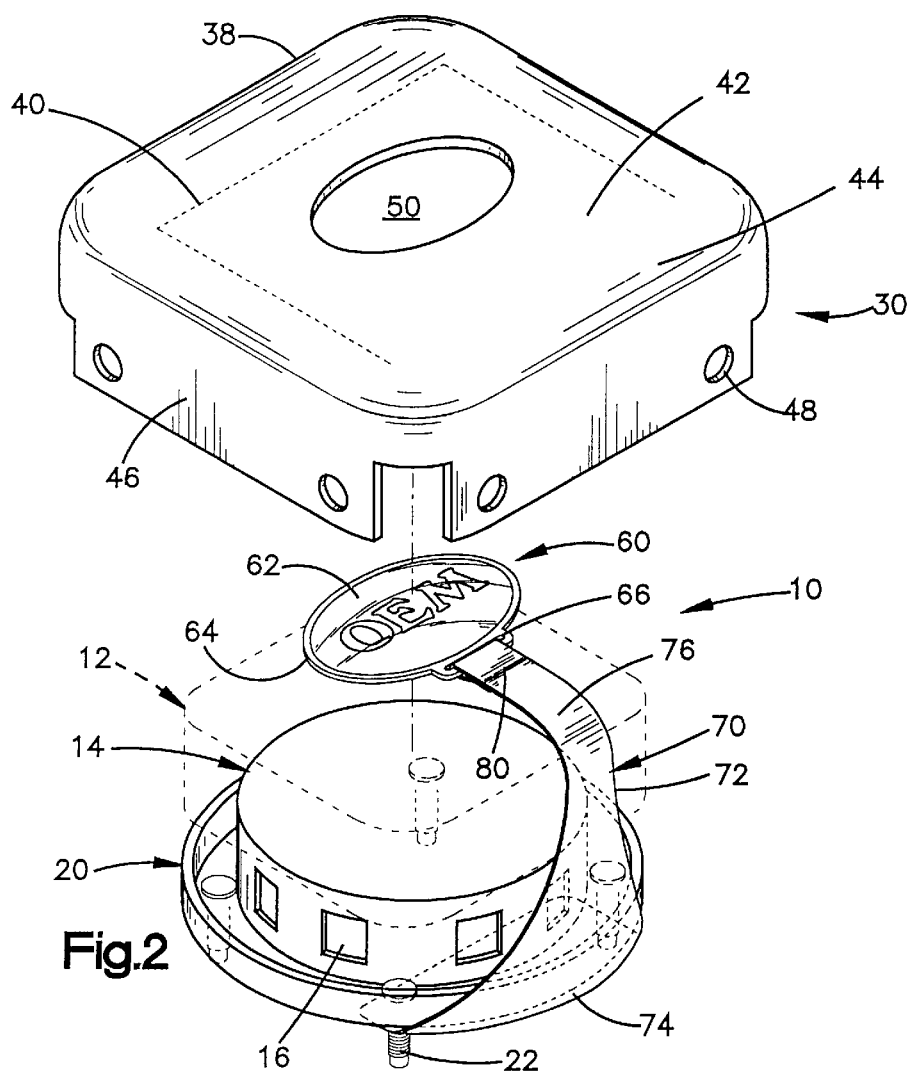
FIG. 2 is an exploded perspective view of parts of the module of FIG. 1.
Figure 3:
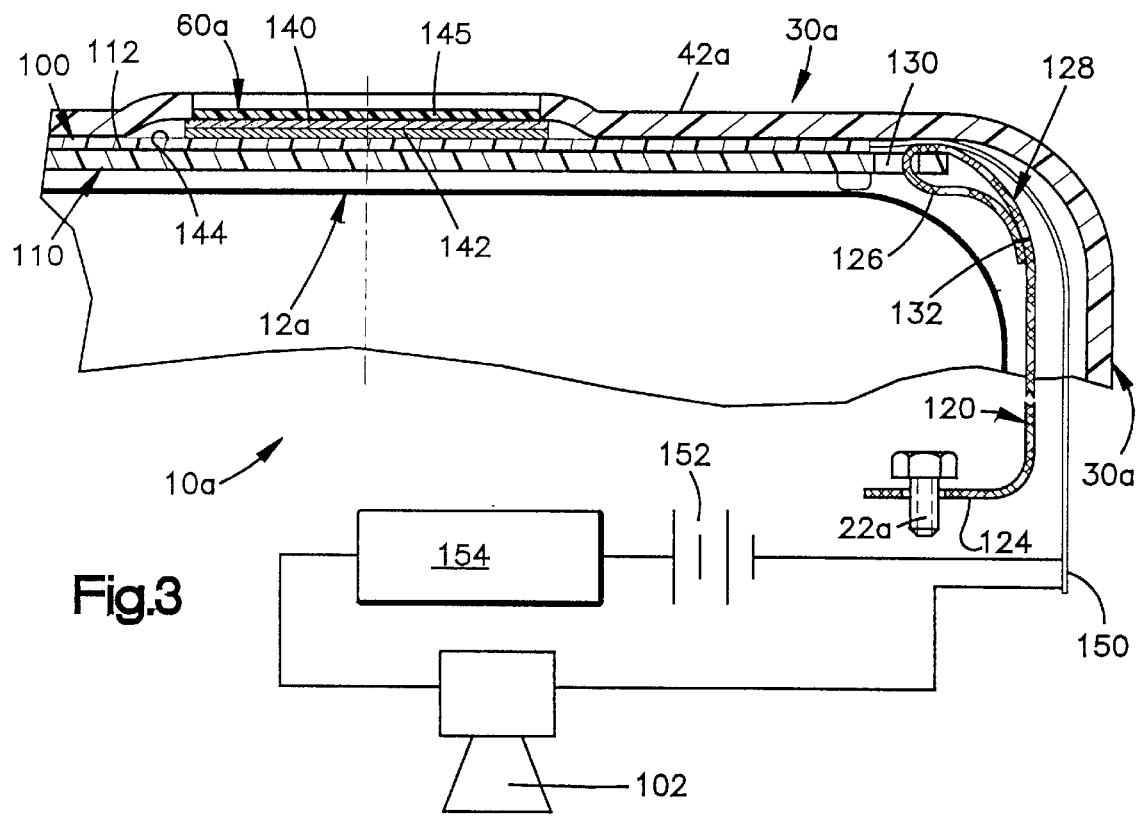
FIG. 3 is a partial sectional view of an air bag module in accordance with a second embodiment of the present invention.
Figure 4:
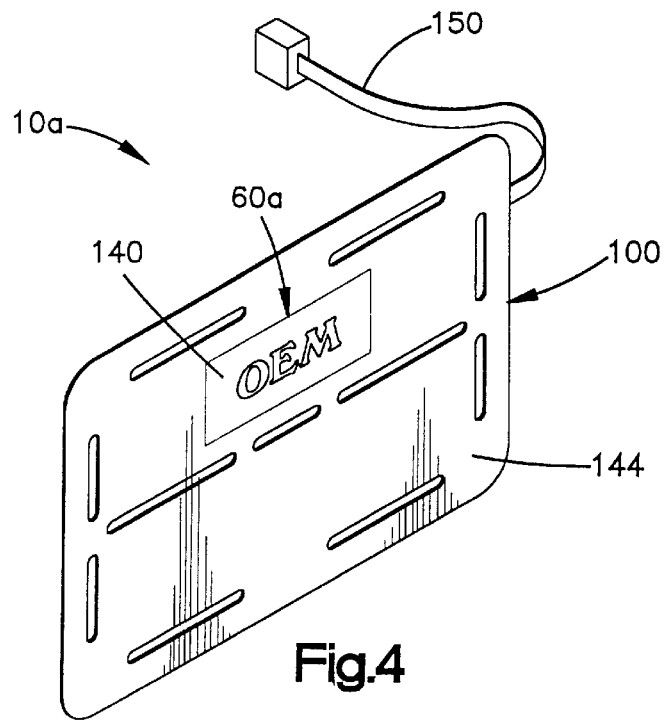
FIG. 4 is a perspective view of a portion of the air bag module of FIG. 3.

FIGS. 3 and 4 illustrate portions of an air bag module 10a which is constructed in accordance with a second embodiment of the present invention. The air bag module 10a is similar in construction to the air bag module 10 (FIGS. 1–2) and similar parts are given the same reference numerals with the suffix "a" added for clarity.

The air bag module 10a includes a switch assembly or switch 100 (FIGS. 3 and 4) for actuating an electrically actuatable device of the vehicle, such as a vehicle horn indicated schematically at 102 (FIG. 3). In the preferred embodiment, the switch 100 is a known membrane type switch which includes first and second layers of flexible substrate material, on which layers of electrically conductive material are deposited. The layers of electrically conductive material are engageable with each other, in response to the application of force to the switch 100, to change the resistance of the switch.

The switch 100 is mounted with a rigid, generally planar backer plate or back plate 110 at a position underlying the movable cover part 42a. The back plate 110 is made from a material which is more rigid than the material of the cover 30a. The back plate 110 provides a rigid support for the switch 100, so that force applied to the cover 30a can result in operation of the switch.

The switch 100 is positioned between the cover 30a and the back plate 110. The switch 100 as illustrated is adhered to an outer side surface 112 of the back plate 110. The switch 100 may, alternatively, be pinned or heat staked to the back plate 110. The switch 100 and the back plate 110 are secured to the movable part 42a of the cover 30a by projecting portions of the cover which extend through slots or other openings in the switch and the back plate.

The air bag module 10a includes a flexible tether 120 for helping to resist movement of the back plate and horn switch away from the retaining ring. In the illustrated embodiment, the tether 120 is made from an elongate strap of fabric material, such as woven nylon of the type from which the air bag 12a is constructed. Alternatively, the strap could be a strip of Mylar with the lead wires 150 embedded or otherwise secured to the Mylar strip. The Mylar strip could be formed as one piece with the horn switch 100.

One end portion 124 of the tether 120 is connected to the vehicle structure by two of the fasteners 22a on the retaining ring (shown in FIG. 3). The second end portion 126 of the tether 120 is formed into a loop 128 and extends through a slot 130 in the back plate 110. The loop 128 is sewn to itself at 132 to connect the second end portion 126 of the tether 120 with the back plate 110.

The air bag module includes an emblem 60a connected with the horn switch 100 for movement with the horn switch. The emblem 60a comprises a painted surface 140 which is silk screened, or otherwise applied, to a metal backing layer 142. The metal backing layer 142 is applied to an outer side surface 144 of the horn switch 100. The emblem 60a includes a protective covering 145 over the paint layer 140. The emblem 60a may be formed on an active or flexible portion of the horn switch 100, because the paint layer 140 and the metal layer 142 are relatively flexible.

A pair of lead wires 150 or other known type of electrical conductor extends from the switch 100. The lead wires 150 connect the switch 100 with the vehicle horn 102, with a power source 152 such as the vehicle battery, and with vehicle electric circuitry indicated schematically at 154.

To effect operation of the vehicle horn 102, the driver of the vehicle presses on the cover 30a of the air bag module 10a in a downward direction as viewed in FIG. 3. The force applied to the cover 30a of the air bag module 10a is transmitted through the cover to the switch 100. The switch 100, supported by the back plate 110, is operated, and the vehicle horn 102 is energized. When the force on the cover 30a of the air bag module 10a is released, the resilience of the cover causes it to move away from the air bag 12a. As this movement occurs, the switch 100 returns to its original condition and the vehicle horn 102 is de-energized.

The switch 100 can be used to actuate an electrically actuatable device of the vehicle other than the vehicle horn 102. For example, the switch 100 could be used to actuate or control the vehicle radio, speed control, etc. Alternatively, the switch 100 could have a plurality of electrically independent active areas for controlling a plurality of electrically actuatable devices including the vehicle horn 102.

When the air bag 12a inflates in the event of, for example, a vehicle collision, the force of the inflating air bag is applied toward the inside of the emblem 60a and the cover 30a. Specifically, the inflating air bag 12a pushes outward against the inner side surface 114 of the back plate 110 and the horn switch 100. The cover 30a opens along the tear seam 40a, which is the predetermined weakened portion of the cover. The cover 30a opens sufficiently that the air bag 12a inflates into a position to help protect the vehicle occupant.

When the cover 30a moves to the open condition, the emblem 60a moves with the movable cover part 42a. If the force of the inflating air bag 12a should cause the emblem 60a to disengage from the cover 30a, the tether 120 straightens and extends and blocks movement of the back plate 110 away from the retaining ring 20a beyond a predetermined amount. The predetermined amount is the length of the tether 120 when extended. The horn switch 100, and the emblem 60a which is secured to the horn switch, are likewise blocked from movement away from the retaining ring 20 beyond a predetermined amount. Because the tether 120 is flexible, the emblem can be positioned as desired on the cover 30a of the module 10a. At the same time, a secure connection can be provided across the distance between the emblem 60a and the retaining ring 20.

Figure 5:
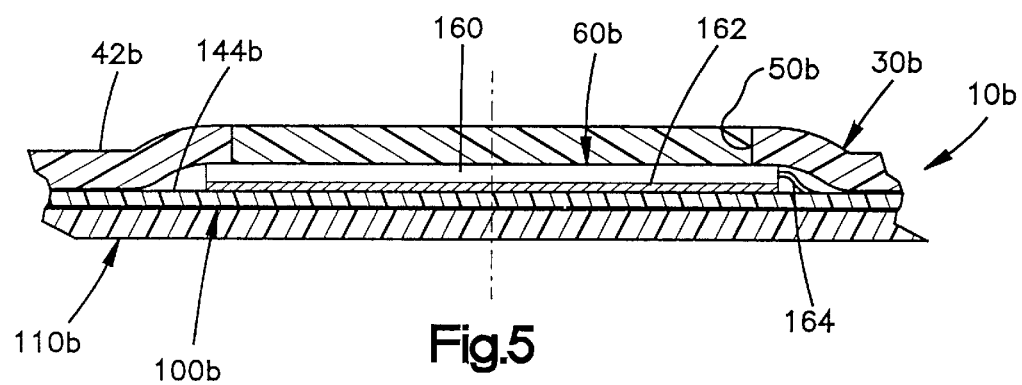
FIG. 5 is a partial sectional view of an air bag module in accordance with a third embodiment of the present invention.

FIG. 5 illustrates a portion of an air bag module 10b in accordance with a third embodiment of the present invention. The air bag module 10b is generally similar to the air bag module 10a (FIGS. 3 and 4) and similar parts are given the same reference numerals with the suffix "b" attached for clarity.

The air bag module 10b includes a tethered horn switch 100b and back plate 10b as in the embodiment of FIG. 4. In the module 10b, the emblem 60b comprises a liquid crystal display (LCD) 160 disposed on a reflective metal layer 162. The metal layer 162 is formed directly on the outer side surface 144b of the horn switch 100b. The emblem 60b is formed on an inactive (non-flexible) portion of the horn switch 100b, because the liquid crystal display LCD 160 is not flexible.

An optical window 146 is molded into the opening in the movable part 42b of the cover 30b. The optical window 146 covers and protects the emblem 60b. The emblem 60b remains visible through the optical window 146. The optical window 146 is preferably made from castable urethane. The emblem 60b may alternatively include a protective covering such as the covering 145 (FIG. 3), if there is no optical window. Either one of these alternatives is usable in conjunction with any of the embodiments of the present invention.

Electric current is supplied to the LCD emblem 60b through the horn switch 100b via lead wires or conductive traces indicated schematically at 164. Thus, the emblem 60b is electrically illuminable when the vehicle electric circuitry is active. Operation of the horn switch 100b is similar to operation of the horn switch 100 (FIG. 3).

When the air bag inflates, the cover 30b opens along a tear seam. When the cover 30b moves to the open condition, the emblem 60b moves with the movable cover part 42b. If the force of the inflating air bag 12b should cause the emblem 60b to disengage from the cover 30b, the tether (not shown) straightens and extends and blocks movement of the back plate 110b away from the retaining ring (not shown in FIG. 5) beyond a predetermined amount. The predetermined amount is the length of the tether 120b when extended. The horn switch 100b, and the emblem 60b which is secured to the horn switch, are likewise blocked from movement away from the retaining ring beyond a predetermined amount.

Figure 6:
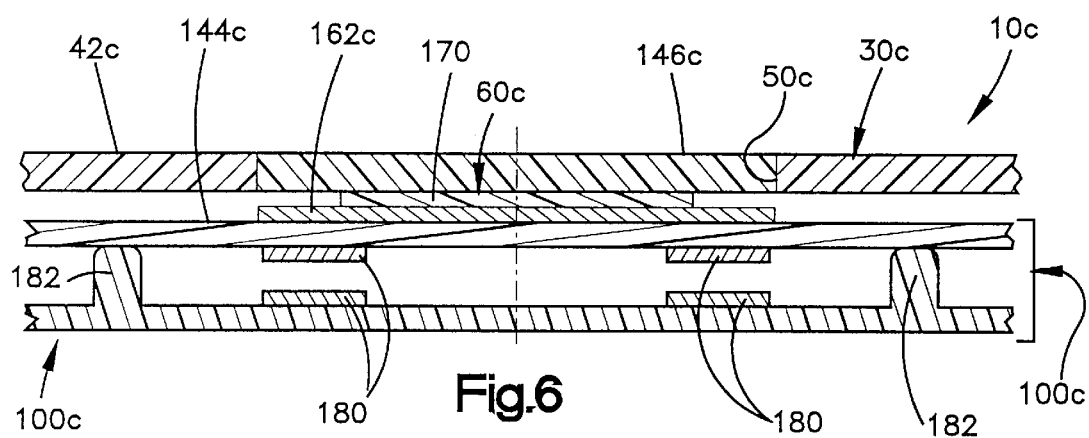
FIG. 6 is a partial sectional view of an air bag module in accordance with a fourth embodiment of the present invention.

FIG. 6 illustrates a portion of an air bag module 10c in accordance with a fourth embodiment of the present invention. The air bag module 10c is generally similar to the air bag module 10b (FIG. 5) and similar parts are given the same reference numerals with the suffix "c" attached for clarity.

The air bag module 10c includes a tethered horn switch 100c. The switch 100 includes two flexible layers with spaced electrical contacts 180 normally separated by stand-offs 182.

In the module 10c, the emblem 60c comprises a holographic display 170. The holographic display 170 is disposed on a reflective metal layer 162c. The metal layer 162c is formed directly on the outer side surface 144c of the horn switch 100c. The holographic display emblem 60c can be mounted on an active (flexible) portion of the horn switch 100c, because the holographic display 170 is flexible.

Operation of the horn switch 100c is similar to operation of the horn switch 100b (FIG. 5). When the air bag inflates, the cover 30c opens along the tear seam. When the cover 30c moves to the open condition, the emblem 60c moves with the movable cover part 42c. If the force of the inflating air bag 12c should cause the emblem 60c to disengage from the cover 30c, the tether 120c (not shown) straightens and extends and blocks movement of the horn switch 100c away from the retaining ring beyond a predetermined amount. The predetermined amount is the length of the tether 120c when extended. The horn switch 100c, and the emblem 60c which is secured to the horn switch, are likewise blocked from movement away from the retaining ring (not shown in FIG. 6) beyond a predetermined amount.

From the above description of the invention, those skilled in the art will perceive improvements, changes and modifications. For example, the present invention is not limited to an air bag module which is mounted on a vehicle steering wheel. The present invention can be used with an air bag module mounted on a vehicle instrument panel, a vehicle seat or door panel, or other portion of the vehicle. In addition, the emblem may be a functional device rather than a decorative one. For example, the emblem may comprise a switch or a control or an indicator for one or more vehicle functions such as radio or speed control. In this case, because the emblem is visible through an opening in the cover, the emblem can be engaged by a vehicle occupant to actuate a function controlled by the emblem. Such improvements, changes and modifications within the skill of the art are intended to be covered by the appended claims.

Having described the invention, we claim:

1. A vehicle safety apparatus comprising:

a vehicle occupant protection device inflatable from a deflated condition to an inflated condition to help protect a vehicle occupant;

support structure to mount said protection device on a portion of a vehicle;

a cover including a cover portion movable from a closed condition to an open condition upon inflation of said protection device;

an emblem;

said cover portion having an opening extending through said cover portion and through which said emblem is visible to the vehicle occupant;

said emblem being retained in a position aligned with the opening in said cover portion when said protection device is in the deflated condition, said emblem being movable relative to said cover portion upon inflation of said protection device; and means connected to said emblem and to said support structure for resisting movement of said emblem away from said support structure beyond a predetermined amount upon inflation of said protection device, said means being located between said cover and said vehicle occupant protection device when in its deflated condition.

2. An apparatus as set forth in claim 1 wherein said means for resisting movement comprises a flexible tether connected between said emblem and said support structure.

3. An apparatus as set forth in claim 2 wherein said flexible tether is made from an elongate strap of fabric material.

4. An apparatus as set forth in claim 1 comprising a flexible tether connected between an electric switch and said support structure for resisting movement of said electric switch away from said support structure beyond a predetermined amount upon inflation of said protection device.

5. An apparatus as set forth in claim 4 wherein said tether is adhesively secured to said electric switch.

6. An apparatus as set forth in claim 1 wherein said emblem is a holographic device connected for movement with said electric switch.

7. An apparatus as set forth in claim 1 wherein said emblem is a liquid crystal display device connected for movement with said electric switch.

8. An apparatus as set forth in claim 1 wherein said emblem comprises a layer of paint on said electric switch.

9. An apparatus as set forth in claim 1 wherein said means for resisting movement straightens and extends and blocks movement of said emblem away from said support structure beyond a predetermined amount if the force of the inflating inflatable device should disengage said emblem from said cover.

10. A vehicle safety apparatus comprising:

a vehicle occupant protection device inflatable from a deflated condition to an inflated condition to help protect a vehicle occupant;

support structure to mount said protection device on a portion of a vehicle;

a cover including a cover portion movable from a closed condition to an open condition upon inflation of said protection device;

an emblem;

said cover portion having an opening through which said emblem is visible to the vehicle occupant;

said emblem being retained in a position aligned with the opening in said cover portion when said protection device is in the deflated condition, said emblem being movable relative to said cover portion upon inflation of said protection device; and means connected to said emblem and to said support structure for resisting movement of said emblem away from said support structure beyond a predetermined amount upon inflation of said protection device, said support structure comprising a retaining ring of an air bag module which retaining ring is secured to a vehicle steering wheel, said structure for resisting movement comprising a flexible tether connected between said emblem and said support structure, an end portion of said tether being formed into a loop and extending through a slot in said emblem to connect said end portion of said tether with said emblem.

* * * * *